(12) United States Patent  (10) Patent No.: US 7,609,644 B2
Tateson  (45) Date of Patent: Oct. 27, 2009

(54) AD HOC COMMUNICATIONS SYSTEM

(75) Inventor: Jane E Tateson, Woodbridge (GB)

(73) Assignee: British Telecommunications plc, London (GB)

( * ) Notice: Subject to any disclaimer, the term of this patent is extended or adjusted under 35 U.S.C. 154(b) by 409 days.

(21) Appl. No.: 10/560,617

(22) PCT Filed: May 7, 2004

(86) PCT No.: PCT/GB2004/001999

§ 371 (c)(1), (2), (4) Date: Dec. 14, 2005

(87) PCT Pub. No.: WO2005/006668

PCT Pub. Date: Jan. 20, 2005

(65) Prior Publication Data

US 2006/0126524 A1    Jun. 15, 2006

(30) Foreign Application Priority Data

Jul. 4, 2003   (GB) ................................. 0315758.3
Jul. 8, 2003   (GB) ................................. 0315969.6

(51) Int. Cl.
*H04L 12/54* (2006.01)
(52) U.S. Cl. ...................... 370/252; 370/401; 370/428
(58) Field of Classification Search ................ 370/246, 370/252, 351, 412, 400–401, 428
See application file for complete search history.

(56) References Cited

U.S. PATENT DOCUMENTS 5,987,001 A  11/1999  Ishioka et al.
6,038,215 A   3/2000  Uekumasu 6,118,834 A   9/2000  Räsänen (Continued)

FOREIGN PATENT DOCUMENTS

| DE | 10108555 | 9/2002 |
|---|---|---|
| WO | WO 99/46899 | 9/1999 |
| WO | 2005/006668 A1 | 1/2005 |

OTHER PUBLICATIONS

UK Search Report dated Dec. 8, 2003.

(Continued)

*Primary Examiner*—Ricky Ngo
*Assistant Examiner*—Ben H Liu
(74) *Attorney, Agent, or Firm*—Nixon & Vanderhye PC

(57) ABSTRACT

A number of data collection devices are free to move relative to each other through their environment, collecting data from their environment. They form an ad hoc wireless network in which data collected by a device either by its own sensors, or relayed from another device is transmitted to a destination either directly or by means of one or more other devices. The destination collects data collected by the mobile terminals for subsequent processing. The wireless links between them have to be re-arranged in order to provide the optimum network. When two devices come into proximity to each other, a forwarding direction is determined to identify to which device data should be forwarded. The devices co-operate to define their forwarding directions by exchanging data relating to their physical locations, and factors such as the spare capacity of their buffer stores, and battery condition. Thus a network will be defined dynamically, each device having its forwarding direction aimed in the direction of the next device until they reach a sink.

13 Claims, 4 Drawing Sheets

U.S. PATENT DOCUMENTS

| | | | |
|---|---|---|---|
| 6,167,030 | A * | 12/2000 | Kilkki et al. ............... 370/236 |
| 6,385,174 | B1 | 5/2002 | Li |
| 0,204,587 | A1 | 10/2003 | Billhartz |
| 6,735,448 | B1 | 5/2004 | Krishnamurthy et al. |
| 6,904,275 | B2 | 6/2005 | Stanforth |
| 6,961,310 | B2 | 11/2005 | Billhartz |
| 6,993,342 | B2 * | 1/2006 | Kuchibhotla et al. ......... 455/450 |
| 7,023,823 | B2 | 4/2006 | Herrmann et al. |
| 7,027,426 | B2 | 4/2006 | Lipasti et al. |
| 2002/0039357 | A1 | 4/2002 | Lipasti |
| 2003/0072306 | A1 * | 4/2003 | Hunzinger ................. 370/389 |
| 2003/0109285 | A1 * | 6/2003 | Reed et al. ................. 455/562 |
| 2006/0206857 | A1 | 9/2006 | Liu et al. |

OTHER PUBLICATIONS

International Search Report—Oct. 11, 2004.

He, "Speed: A Real-Time Routing Protocol for Sensor Networks" 'Online! Mar. 2002, pp. 1-12, XP002300153.

Singh, "Power-Aware Routing in Mobile Ad Hoc Networks", Proceedings of the $4^{TH}$ Annual ACM-IEEE International Conference on Mobile Computing and Networking, 'Online!, Oct. 1998, pp. 181-190, XP002300154.

Tateson et al., "A Novel Mechanism for Routing in Highly Mobile Ad Hoc Sensor Networks" 'Online! 2004, pp. 204-217, XP002300155, 2002.

Becker et al., "Transition-Independent Decentralized Markov Decision Processes", pp. 41-48, XP-002302634.

David et al., "Bidders' Strategy for Multi-Attribute Sequential English Auction with a Deadline", XP-002302633, pp. 457-464, Bar-Ilan University, Department of Computer Science, Ramai-Gan 52900, Israel, 2002.

Gold, et al., "Use of Context-Awareness in Mobile Peer-to-Peer Networks," Proceedings, IEEE Workshop on Future Trends of Distributed Computing Systems, XX, XX, pp. 142-147, Oct. 31, 2001, XP0010886511.

Perkins, et al., "Highly Dynamic Destination-Sequenced Distance-Vector Routing (DSDV) for Mobile Computers," Proceedings of the Sigcomm '94 Conference on Communication Architectures, Protocols and Applications, pp. 234-244, Aug. 1994.

Park, et al., "A Highly Adaptive Distributed Routing Algorithm for Mobile Wireless Networks," Proceedings of Infocom '97, pp. 1405-1413, Apr. 1997.

Stojmenovic, et al., "Power-Aware Localized Routing in Wireless Networks," IEEE Transactions on Parallel and Distributed Systems, IEEE Inc., NY, vol. 12, No. 11, pp. 1122-1133, Nov. 2001.

Stojmenovic, "Position-Based Routing in Ad Hoc Networks," IEEE Communications Magazine, IEEE Service Center, Piscataway, NJ, US, vol. 40, No. 7, Jul. 2002, pp. 128-134, XP001132650.

Johnson, "Routing in Ad Hoc Networks of Mobile Hosts," Proceedings of the IEEE Workshop on Mobile Computing Systems and Applications, pp. 158-163, Dec. 1994.

Perkins, "Ad Hoc on Demand Distance Vector (AODV) Routing," Internet-Draft, draft-ietf-manet-aodv-04.txt, Oct. 1999.

Toh, "Maximum Battery Life Routing to Support Ubiquitous Mobile Computing in Wireless Ad Hoc Networks," IEEE Communications Magazine, Jun. 2001.

Heinzelman, et al., "Energy Efficient Routing Protocols for Wireless Microsensor Networks," Proceedings of the $33^{rd}$ International Conference on System Sciences (HICSS '00), Jan. 2000.

Cerpa, et al., Habitat Monitoring: Application Driver for Wireless Communications Technology, ACM SIGCOMM Workshop on Data Communications in Latin America and the Caribbean, Costa Rica, Apr. 2001.

Xu, et al., "Adaptive Energy-Conserving Routing for Multihop Ad Hoc Networks," Tech. Rep. 527, USC/Information Sciences Institute, Oct. 2000.

Culler, et al., "Network-Centric Approach to Embedded Software for Tiny Devices," Darpa Workshop on Embedded Software, Jan. 2001.

Doherty, "Algorithms for Position and Data Recovery in Wireless Sensor Networks," UC Berkeley EECS Masters Report, May 2000.

Pradhan, et al., "Distributed Source Coding Using Syndromes (DISCUS): Design and Construction," Proc. IEEE Data Compression Conference (DCC), 1999.

Pradhan, et al., "Distributed Source Coding: Symmetric Rates and Applications to Sensor Networks," Proc. IEEE Data Compression Conference (DCC), Mar. 2000.

Kusuma, et al., "Distributed Source Coding for Sensor Networks," Proc. IEEE Conf. On Image Processing (ICIP), Oct. 2001.

Ng, et al., "Approximate Inference Algorithms for Two-layer Bayesian Networks," Advances in Neural Information Processing Systems, Cambridge, MA , 2000.

Saul, et al., "Attractor Dynamics for Feedforward Neural Networks," Neural Computation, vol. 12, pp. 1313-1335, 2000.

Jaaklcola, etal., "Bayesian Parameter Estimation Via Variational Methods," Statistics and Computing, vol. 10, pp. 25-37, 2000.

Jaakicola, et al., "Variational Probabilistic Inference and the QMR-DT Network," Journal of Artificial Intelligence Research, vol. 10, pp. 291-322, 1999.

Jordan et al., "An Introduction to Variational Methods for Graphical Models," Machine Learning, vol. 37, pp. 183-233, 1999.

Schurgers, et al., "Energy Efficient Routing in Wireless Sensor Networks," Networked & Embedded Systems Lab (NESL), Electrical Engineering Department, University of California At Los Angeles UCLA), CA, 2000.

Wan, Presentation - "Energy Conservation in Ad Hoc and Sensor Networks - The Design Considerations," May 2, 2002.

International Search Report dated Oct. 18, 2004, re PCT/GB2004/003510.

EPO Examination Report dated Aug. 18, 2008, re EP 04 768 073.1.

EPO Examination Report dated May 25, 2007, re EP 04 768 073.1.

EPO Examination Report dated Jan. 11, 2007, re EP 04 731 660.9.

EPO Examination Report dated Aug. 21, 2006, re EP 04 731 660.9.

* cited by examiner

AD HOC COMMUNICATIONS SYSTEM

CROSS-REFERENCE TO RELATED APPLICATIONS

This application is the US national phase of international application PCT/GB2004/001999 filed 7 May 2004 which designated the U.S. and claims benefit of GB 0315758.3, dated 4 Jul. 2003 and GB 0315969.6, dated 8 Jul. 2003, the entire content of which is hereby incorporated by reference.

BACKGROUND

1. Technical Field

This invention relates to ad hoc networking application, in which a number of communications devices co-operate to form a communications network.

2. Related Art

There are two basic types, namely many-to-many communication, wherein the devices communicate with conventional fixed networks through interface or edge devices. The communications devices form nodes of a wireless network, allowing data to be relayed from an originating communications device to a destination communications device, by way of other communications devices. Such devices have a number of applications in circumstances where the communications devices are likely to be moving in unpredictable ways. A particular application scenario is a sensor network, in which data is collected from a network of mobile sensor devices, each of which is capable of taking measurements and relaying packets of data. Such devices are used by scientists taking measurements of the behaviour of the atmosphere, the sea, ice caps, lava flows or wildlife. The environments in which such devices are required to operate often have measurement points widely dispersed in both space and time. Some of the environments are hostile to human life. In some applications, such as the study of animal behaviour, human intervention could compromise the data. For these reasons the devices must be capable of operating autonomously, and transmitting the data they collect to a more convenient point using a wireless medium such as radio or sound. Moreover it is not usually possible to provide a continuous power supply, so the useful life of a device is primarily constrained by battery life.

Other applications for such ad hoc networks, to which the invention might be applied, include "tagging" technology for monitoring the health of patients and the elderly in the community, or of the location of people subject to court orders restricting their movements. More generally, ad hoc networks can be made up of wireless laptop computers or mobile telephones in close proximity to each other. Military personnel, police or other emergency services could also use the invention when attending an incident where there are insufficient channels for all the users to communicate directly with the fixed base stations provided in the vicinity. In these cases, more conventional communication devices could become part of ad hoc wireless networks, exploiting short range transmissions and device relays towards an identified base station, or fixed network device.

Many ad hoc routing protocols have been devised. Some of the most widely known are:

DSDV, described by C Perkins and P Bhagwat, Highly Dynamic Destination-Sequenced Distance-Node pair Routing (DSDV) for mobile computers, *Proceedings of the SIGCOMM '94 Conference on Communications Architectures, Protocols and Applications*, pages 234-244, August 1994

TORA, described by V D Park and M S Corson, A Highly Adaptive Distributed routing Algorithm for Mobile Wireless Networks, *Proceedings of INFOCOM '97*, pages 1405-1413, April 1997

DSR, described by D B Johnson, Routing in Ad hoc Networks of Mobile Hosts, *Proceedings of the IEEE Workshop on Mobile Computing Systems and Applications*, pages 158-163, December 1994

AODV, described by C Perkins, Ad hoc On Demand Distance Node pair (AODV) Routing, *Internet-Draft, draft-ietf-manet-aodv*-04.txt, October 1999

DSDV maintains a routing table listing the next "hop" for each reachable destination. Routes are tagged with sequence numbers, with the most recently determined route, with the highest sequence number, being the most favoured. There are periodic updates of routes and sequence numbers. TORA discovers routes on demand and gives multiple routes to a destination. Route query and update packets are sent for each destination. Although routes are established fairly quickly, there are often routing loops, leading to dropped packets. DSR uses source routing, rather than hop-by-hop routing, so each packet has a complete route, listed in its header. This protocol uses route discovery and route maintenance, with nodes maintaining caches of source routes that have been learned or overheard. AODV combines route discovery and route maintenance with hop-by-hop routing. Route request packets create reverse routes for themselves back to their source devices. "Hello" messages are periodically transmitted by the devices, so that neighbours are aware of the state of local links.

A comparison of the performance of these protocols by J Broch, D A Maltz, D B Johnson, Y-C Hu, ("A Performance Comparison of Multi-Hop Wireless Ad Hoc Network Routing Protocols", *Proceedings of the Fourth Annual ACM/IEEE International Conference on Mobile Computing and Networking, Mobicom '98*, October 1998, Dallas, Tex.), has shown widely differing results in the size of routing overhead. The total overhead is greatest for TORA, and becomes unacceptably large for a network size of thirty source devices.

Moreover, all of these prior art protocols require large processor and memory capacities, and their protocols do not take account of the energy usage required. Energy usage, along with memory and processor capacity, are particularly important in sensor networks. These typically consist of very small, very cheap microprocessors, e.g. 16 bit, with 32 kilobytes of RAM. They also have a finite battery supply, which would be impractical to replace given the nature of the applications in which the sensors are to be used. It is therefore very important that any communication protocol is energy-efficient aware, and also pared to a minimum in communication overhead and memory usage. In other applications, battery and memory usage are also important considerations: a user would be unwilling to allow his mobile telephone to form part of such an ad hoc network if other users caused a significant drain on either of these resources whilst his own device was not actively engaged in a call.

A number of lightweight ad hoc routing protocols have been proposed. The work by Toh already discussed describes a wireless communication network, and a scheme to maximise the battery life of ad hoc devices in the network. S Singh, M Woo and C Raghavendra, have made a detailed study of power-conservation in ad hoc networks at the MAC and network layers ("Power-Aware Routing in Mobile Ad hoc Networks". *Proceedings of the Fourth Annual ACM/IEEE International Conference on Mobile Computing and Networking (MobiCom)*, (Dallas, Tex., October 1998)). They include schemes for devices to power-down in between expected transmissions, and they take into account device load as an important factor in power consumption. Their main concern is to prevent network partitioning when gaps appear in the network as a result of devices running out of battery power. Work by W B Heinzelman, A P Chandrakasan and H Balakrishnan considers sensor networks specifically. ("Energy-Efficient Routing Protocols for Wireless Microsensor Networks", *Proceedings of the 33rd International Conference on System Sciences* (*HICSS '00*), January 2000). This work assumes variable device broadcast range. Their focus is on the use of clustering techniques to reduce bandwidth usage by, for example, data aggregation of similar data, and using predictable transmission times, coordinated by the cluster heads. This approach saves significant energy, compared with an always-on approach, but the routing side is simplistic and not fully developed. In particular, their experimental scenario assumes the devices could all broadcast to the base station if they chose to do so, which would not be realistic, in general, for sensor network applications. Work by A Cerpa, J elson, D Elstrin, L Girod, M Hamilton and J Zhao, refers to habitat monitoring as a driver for wireless communications technology, and focuses on power-saving by having devices switching themselves on and off according to whether they are in the vicinity of regions where interesting activity is expected, or detected by other devices. ("Habitat Monitoring: Application Driver for Wireless Communications Technology", *ACM SIGCOMM Workshop on Data Communications in Latin America and the Caribbean*, Costa Rica, April 2001. Work by Y. Xu, J. Heidemann, and D. Estrin again focuses on using powered-down modes for devices to conserve power, based on whether payload data is predicted or not, and on the number of equivalent devices nearby that could be used for alternate routing paths. ("Adaptive energy-conserving routing for multihop ad hoc networks", *Tech. Rep.* 527, *USC/Information Sciences Institute*, October, 2000) The assumption here is that the underlying routing will be based on conventional ad hoc routing protocols such as the AODV system already discussed. Sensor networks, however, typically would require a lighter weight approach to routing, where decisions are based on information from immediate neighbours only, and this knowledge needs to be conveyed succinctly, ideally as part of the packet headers for the actual data to be collected.

A lot of work has been done at the University of California and the Intel Berkeley Research Lab, to develop operating systems and networks for small ad hoc sensor devices, known as the Smartdust project, for which an operating system known as TinyOS has been developed (D E. Culler, J Hill, P Buonadonna, R Szewczyk, and A Woo. "A Network-Centric Approach to Embedded Software for Tiny Devices". *DARPA Workshop on Embedded Software*. However, the routing scheme they refer to is not power-aware, but rather uses a hierarchical structure to find shortest paths to the sinks.

So, in summary, there are established routing protocols for ad hoc networks that are too resource-intensive for sensor networks and are not power-aware; there are power-aware metrics which have not been applied to ad hoc networks; there are power-aware strategies for ad hoc sensor networks that do not optimise the routing; and there is an extensive ad hoc sensor network project without power-aware routing. Note that none of his prior work refers to highly mobile ad hoc devices, of the kind to which this invention is particularly directed.

As already discussed, prior art routing mechanisms require far more memory and processing power than is suitable for lightweight environmental sensor devices, or assume all devices can communicate directly with the sinks. Also, only the full ad hoc protocols can cope with device mobility, and these require a large communication overhead.

BRIEF SUMMARY

Because the devices are moving rapidly, even their nearest neighbours may change between data transmissions. Routing decisions must be made 'on-the-fly', using very recently gathered information.

In this specification, the term "payload data" is used to mean the useful data which it is desired to transmit, as distinct from overhead data used to control routing of the payload data. Note that there is some degree of overlap between the two types of data: for example the position of the device is necessary for routing purposes, but is also likely to be an important part of the information collected by the sensor for example in the study of ocean currents or animal migratory behaviour.

According to the invention, a mobile data wireless relay device is provided, the device having receiving means for receiving payload data from a data source, a buffer for storing payload data for subsequent transmission, means for receiving status data from similar devices, status data generation means for generating status data, the status data being derived from the quantity of data in the buffer store and the status data received from other devices, and comprising data relating to the position of the device, the quantity of data in the buffer store a scalar forwarding value ($\delta$) and a forwarding direction, status transmitter means for transmitting status data to other devices selection means for identifying from the status data a receiving device to which the payload data is to be forwarded, the receiving device being located in a position indicated by the forwarding direction, payload transmission means for transmitting the payload data to the receiving device.

The wireless relay device may include means for receiving payload data transmitted by other similar devices, or it may be associated with a data source such as an environmental sensor. Preferably it can perform both functions. Note that some data, for example position data, may be both payload and status data.

The selection means may be arranged to only identify a suitable receiving device if the scalar forwarding value meets a threshold criterion The device may include condition-monitoring means for monitoring the expected lifetime of the device, and adjusting the scalar forwarding value accordingly.

In a preferred arrangement, the wireless relay device defines a positive node and a negative node, the nodes being spaced apart by a distance determined by the amount of data stored in the buffer, the positive node being assigned a positive value for an attribute q and the negative node being assigned a negative value for the attribute q, equal in magnitude to that assigned to the positive node, the wireless relay device has means for receiving data broadcast by similar wireless relay devices identifying the position data and attribute values of nodes defined by the similar wireless relay devices, means for generating forwarding position values for the positive and negative nodes based on the attribute values of its own nodes and the positions and attribute values of the nodes defined by the neighbouring devices, means for transmitting the forwarding position data and attribute values to similar wireless relay devices means for transmitting payload data to devices that are in the general direction of the forwarding position of the negative node.

The devices to which payload data is to be transmitted may identify themselves by any suitable means, such as individual call signs. The position data of the nodes will identify which devices are in the appropriate direction. Similarly, payload data will be received by a device according to the invention from similar devices, which will have identified it as being in the general direction of their own negative nodes.

Preferably, the positions of the positive and negative nodes are determined by determining the position in which the aggregate value of the products of the attribute values of each node with each node of one or more neighbouring devices, and some arithmetical function of the distance between them, is a minimum or maximum. In the embodiment to be described, the simple reciprocal of the distance is used.

The spacing between the positive and negative nodes defined by the device is preferably on a similar scale to, but not larger than, the transmission range of the device.

The payload data may be received from another similar device, or generated by the device itself. Some or all of the wireless relay devices may therefore comprise data gathering equipment for generating new data for transmission. In the preferred embodiment each data collection device can also act as a wireless relay devices to retransmit data received from other such devices. However, the scope of the invention does not exclude the presence in the network of some devices that can only transmit data to other devices. Any such device would act as a "source" or "negative sink", and would be defined by a single node with a negative attribute q.

Devices capable of interacting with the wireless relay devices may also be provided, capable only of reception. They act as information "sinks", and would typically be used as the interfaces between the mobile data gathering network and the fixed data-processing system. Such a device is represented as a single node having a positive attribute value q. In a preferred arrangement, the sinks are allocated the maximum attribute value q, and the mobile devices have attribute values whose magnitudes are sub-maximal.

A pair of devices, acting in isolation, would tend to align their node pairs such that all four nodes (three nodes if one of the devices is a source or a sink) define a straight line, with the negative node of one of the devices adjacent to the positive node of the other. If there are more than two devices, they will interact in a more complex manner, the alignments of the nodes of each device being determined not only by the direction of each neighbouring node and the sign of its attribute value, but also by the distance between the nodes and the magnitudes of their attribute values.

The wireless relay devices therefore define a preferred direction for payload data to travel, namely from the negative node of one device towards the positive node of another. If one imagines a line of devices with a sink at one end, the device closest to the sink can express the direction of the sink from itself by the alignment of its positive and negative nodes. The next device in the line may be too far from the sink to be able to transmit directly to it, but can align its node pair with the forwarding direction of the device closest to the sink. Specifically it will be aligned with its negative node closest to the positive node of the first device, and so on, along the line of devices. Consequently, even the device at the furthest end of the line can set its forwarding direction so as to join the path to the sink.

In a real two- or three-dimensional system, devices will not form simple chains but will form branched chains converging on the sink or sinks. In order to accommodate the influence on each device of several other devices, the local forwarding direction is chosen to be the sum of all the alignment influences from its nearest neighbours. The orientation which produces the optimum value is defined as the local forwarding direction. Note that this takes into account not only the position and alignment of devices to which data may be sent, but also of those from which it may be received.

Preferably a forwarding trigger value is calculated, to determine whether payload data should be forwarded. This trigger value determines whether a chain has been formed, and therefore whether it is worthwhile to forward data. This computation depends on the use of a further attribute, $\delta$, which is essentially a variable part of the attribute value q, and depends on the proximity, and attribute values, of neighbouring devices. In the preferred embodiment battery level is used as a further determinant, to ensure that devices whose batteries are depleted forward their data with greater urgency than those with more battery life remaining. Simulation results show that setting a trigger level delivers a significantly higher proportion of data back to the sinks than a method that relies only on forwarding towards the nearest sink.

The devices have no information about whether they are in fact in a chain leading to a sink—they simply pass data to a neighbour if certain conditions are met. As the devices are mobile, from time to time they may find themselves at locations from which no viable chain can be defined towards a sink. In such cases data can be stored in their buffers until communication is re-established. Since the attribute value q is determined by the size of the buffer (or by the available space in the buffer), one device having a full buffer may forward data to another device having more space, even though the receiving device is currently unable to forward it. This makes more space available in the buffer of the transmitting device, allowing it to collect more data either from other devices or from its environment. The receiving device would retain the transferred data until it in turn can forward it.

The wireless relay devices may use directional antennas for transmission and reception of data signals. However, because the alignments selected are based on the aggregate influence of several neighbouring devices, the antennas would have to be of relatively wide beam width. This could be achieved using a multi-sectored antenna with an integrated beam-forming and switching circuit that allows the antenna to form a number of discrete beams, which can be selected individually or in groups to transmit and receive in a specific direction, or can all be combined to provide omni-directional coverage. It would then be possible to determine the direction of send signal, as long as devices had a reference direction (digital compass). Such a system would not require mechanical rotation (with the consequent power and wear implications) However, although such antenna arrays are commercially available, they are currently too large and expensive for the cheap devices envisaged. Moreover, although the positions of the nodes defined with respect to each device may be varied according to the positions and other characteristics of the neighbouring devices, the physical orientation of the device itself is not affected. The physical orientation is determined by the forces causing it to move through its environment, such as ocean or wind currents, or the behaviour of the object to which it is attached, such as an animal whose migratory behaviour is under study. If directional antennas are used, means for accommodating the essentially random orientation of the device would need to be provided.

Although they would reduce the power consumption required for transmission, directional antennas would therefore be difficult to accommodate and control in very small devices. In a preferred embodiment each wireless relay device has an address code to which data intended for that device should be sent. This address code may be a digital code, for example a CDMA chopping code. It may instead be a radio frequency or time slot allocated to that device on which it will listen out. Each device broadcasts its address code as well as its position and other attributes. Thus any neighbour selecting it, according to its direction and distance, as a target to which payload data should be transmitted can identify it by specifying its address. Each device is arranged to only receive data directed to its own address. Given that battery power considerations impose a relatively limited transmission range on the devices, addresses may be duplicated provided that the probability of two duplicate addresses occurring within range of a single transmitting device is low.

According to another aspect of the invention there is provided a network of wireless relay devices comprising a plurality of mobile wireless relay devices capable of receiving payload data, and each having means for identifying a forwarding direction relative to itself, and means for transmitting data to another of the devices whose current position is in the said forwarding direction and within a predetermined distance, wherein the devices co-operate to define their forwarding directions such that payload data is transmitted to a target sink device by means of one or more of the wireless relay devices.

According to a further aspect, there is provided a method of operating a plurality of mobile data wireless relay devices, comprising:

collecting data in buffer stores in one or more such devices, exchanging status data between the devices, the status data comprising data relating to the positions of the devices, the quantity of data in their buffer stores each device defining, from the status data, a forwarding direction towards which the payload data in its buffer store is to be forwarded, transmitting the stored payload data to a device located in the forwarding direction.

This invention provides a wireless relay device that not only identifies a transmission hop in the right direction, but forwards payload data to the neighbouring device giving the best chance of its data getting all the way back to a data sink. It requires no explicit knowledge of the topology of the network, and in particular requires no details of any hop other than the one it is directly connected to. A complete route back to a sink is given by a chain of wireless relay devices, where each wireless relay device is within forwarding range of the previous device in the chain. Such a structure may only exist quite briefly, as the devices move around. Indeed, the complete chain may not all exist at the same time, the individual hops coming into existence at different times as the devices move around.

The invention could also be used to route packets in multi-hop cellular networks to a nearby base station. No sensor-network-specific assumptions are made, e.g. that all nodes generate data. Extension to general ad hoc networks, where any node can send to any other, would involve the nodes maintaining a number of forwarding directions, for different target nodes. In order to overcome scaling difficulties, in such a case, the nodes could be organised into hierarchical clusters, with nodes needing to have forwarding directions to forward to cluster-heads and to nodes within their own clusters.

The invention allows the collection of data from an ad hoc network of highly mobile sensor devices, to one or more "sink" devices, which may also be mobile, in a way that is distributed, robust and lightweight.

Preferably the routing takes account of the battery and memory levels of participating devices, so that devices which are low on resources are less heavily loaded. However, only information from a device's immediate neighbours is available, so any decisions taken must be done on the basis of only a few parameters from a handful of nearest neighbours. This is because of the constraints on the devices' processing power and memory, as well as bandwidth which is severely limited as a result of small, finite battery power.

BRIEF DESCRIPTION OF THE DRAWINGS

An embodiment of the invention will now be described, by way of example only, with reference to the Figures in which.

DETAILED DESCRIPTION OF EXEMPLARY EMBODIMENTS

Figure 1:
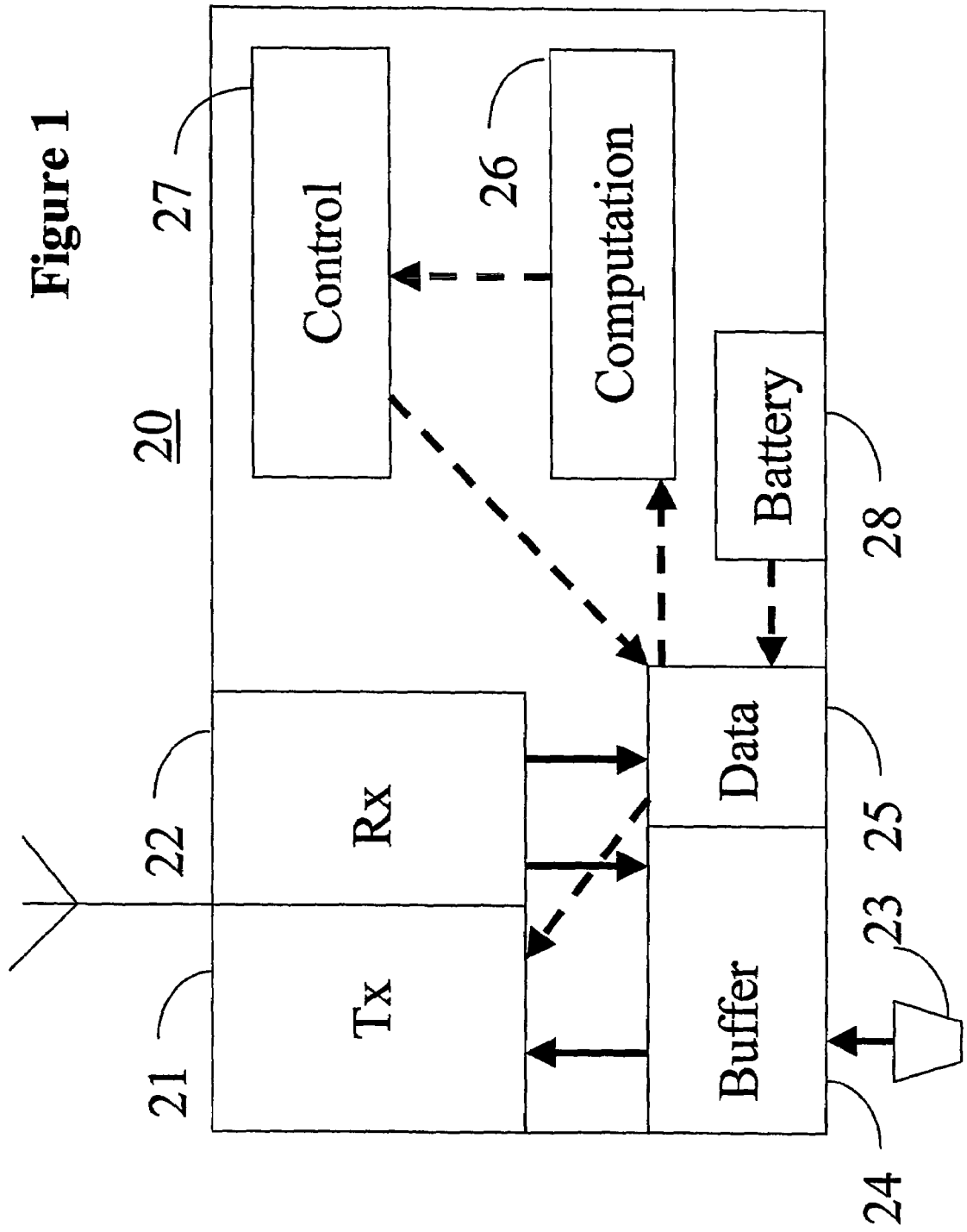
FIG. 1 is a schematic diagram of a device according to the invention.

FIG. 1 shows a device 20 according to the invention. It comprises a wireless transmitter 21 and a wireless receiver 22, and data collection means 23 which include position sensors, and environmental or physiological sensors for determining properties of the environment of the device, or of some object to which it is attached. There is also a data buffer 24 for storing payload data (that is to say, data that is to be transmitted to a destination for processing) and a data store 25 for operational data (that is to say, data required for the operation of the device and in particular for controlling the transmission of the payload data). There is also computation means 26 for processing the data collected by the data collection means 23 and stored in the data buffer 24, and control means 27 for controlling the operation of the device in response to outputs from the computation means 26. The device is powered by a battery 28 whose condition is monitored and the results stored in the data store 25 with other operating parameters. The power connections themselves are not depicted in this schematic diagram).

Figure 2:
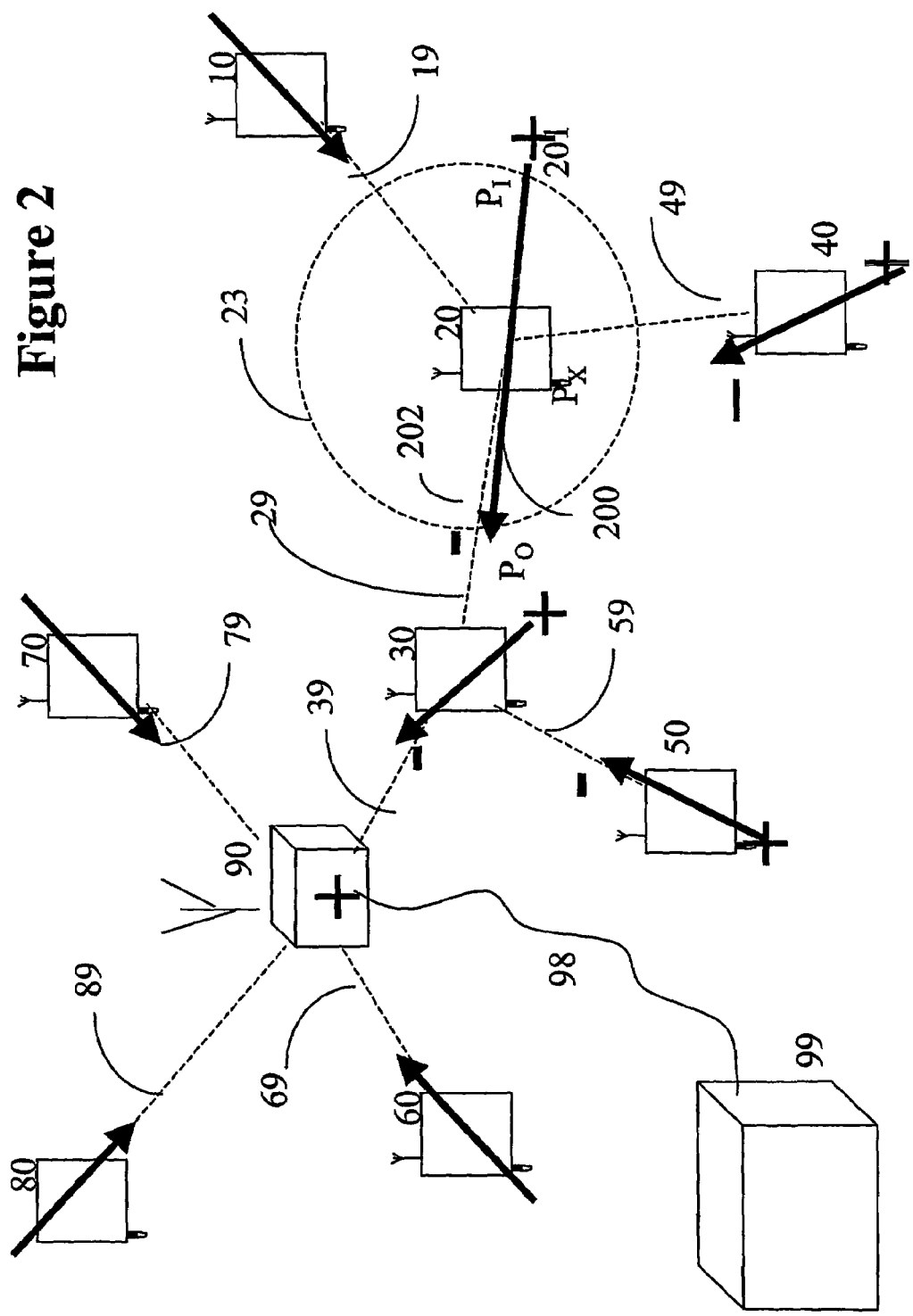
FIG. 2 is a diagram of part of an ad hoc network made up of devices of the kind shown in FIG. 1.

FIG. 2 shows a network comprising several devices 10, 20, 30, 40, 50, 60, 70, 80, each of the type shown in FIG. 1. These devices are free to move relative to each other through their environment, collecting data from their environment such as temperature, barometric pressure, salinity etc). They also record their position. They may be carried by inanimate forces such as ocean or air currents, lava or glacier flows, or they may be attached to animals or human beings to track their movements or physiology, or to a vehicle to monitor its progress on a journey or to locate it if it is reported to have been stolen.

The devices 10, 20, 30, 40 etc shown in FIG. 2 form an ad hoc wireless network 19, 29, 39, 49, etc. The wireless connections may use radio communications, or any other transmission medium suitable for the environment in which the devices are expected to operate. For example, acoustic (sound) waves are suitable for water-borne devices used to study oceanography and ichthyology. Data collected by a device 20 (either by its own sensors 23, or relayed from another device 10) is transmitted to a destination 90 either directly or by means of one or more other devices 30. These other devices may also collect data. The destination 90 is a fixed receiver station, which will be referred to as an information "sink", and which collects data collected by the mobile terminals 10, 20, 30 etc for subsequent processing. There may be more than one sink in the network. The sink device 90 is more powerful than the sensor devices 10, 20 30 etc, both in terms of processing capability and power-consumption, and either have long-term storage facilities for the data, or a long-range transmission link 98 to a data-processing centre 99. The sensor devices 10, 20, 30 themselves have very limited battery power (allowing only short-range wireless transmissions), small processors and limited memory.

As the devices 10, 20 etc move around, the wireless links 19, 29, 39 etc between them have to re-arranged in order to provide the optimum network. As well as physical location, factors such as the spare capacity of the buffer store 24 and the battery 28 are taken into account in determining whether a wireless link 29 should be established between two devices 20, 30. The process by which this is done will be described in detail shortly.

When a device 20 has identified a device 30 to which data can be forwarded, it retrieves data from its buffer 24 and transmits it to the target 30. The device 30 then repeats the process of identifying a suitable neighbour and so on, until the data reaches the sink 90. If no suitable device is identified, the data is stored in the buffer 24 until the movements of the devices brings a suitable device into range.

In general, it is desirable that the devices transmit data in the general direction of the nearest sink 90. Thus when two devices 20, 30 come into proximity to each other, a direction 200 needs to be determined to identify which device 20 should transmit data and which device 30 should receive it. This direction 200 will be referred to as the "forwarding direction" for a given device 20, and defines a receive end 201 and a transmit end 202 for the device 20. The device also determines whether to forward data to the nearest neighbour 30 whose location is in this direction, based on the separation of the devices 20, 30, and other characteristics, as will be described in detail later.

If a sink 90 is within direct transmitting range (as for example is illustrated for device 30), the forwarding direction will be towards the sink. Any device 20 which is not in range of a sink are arranged to align its forwarding direction 200 towards the receive end of one or more neighbouring devices 30. Thus a network 19, 29, 39 etc will be defined, each device having its transmit end aimed in the direction of the receive end of the next device until they reach a sink.

Figure 3:
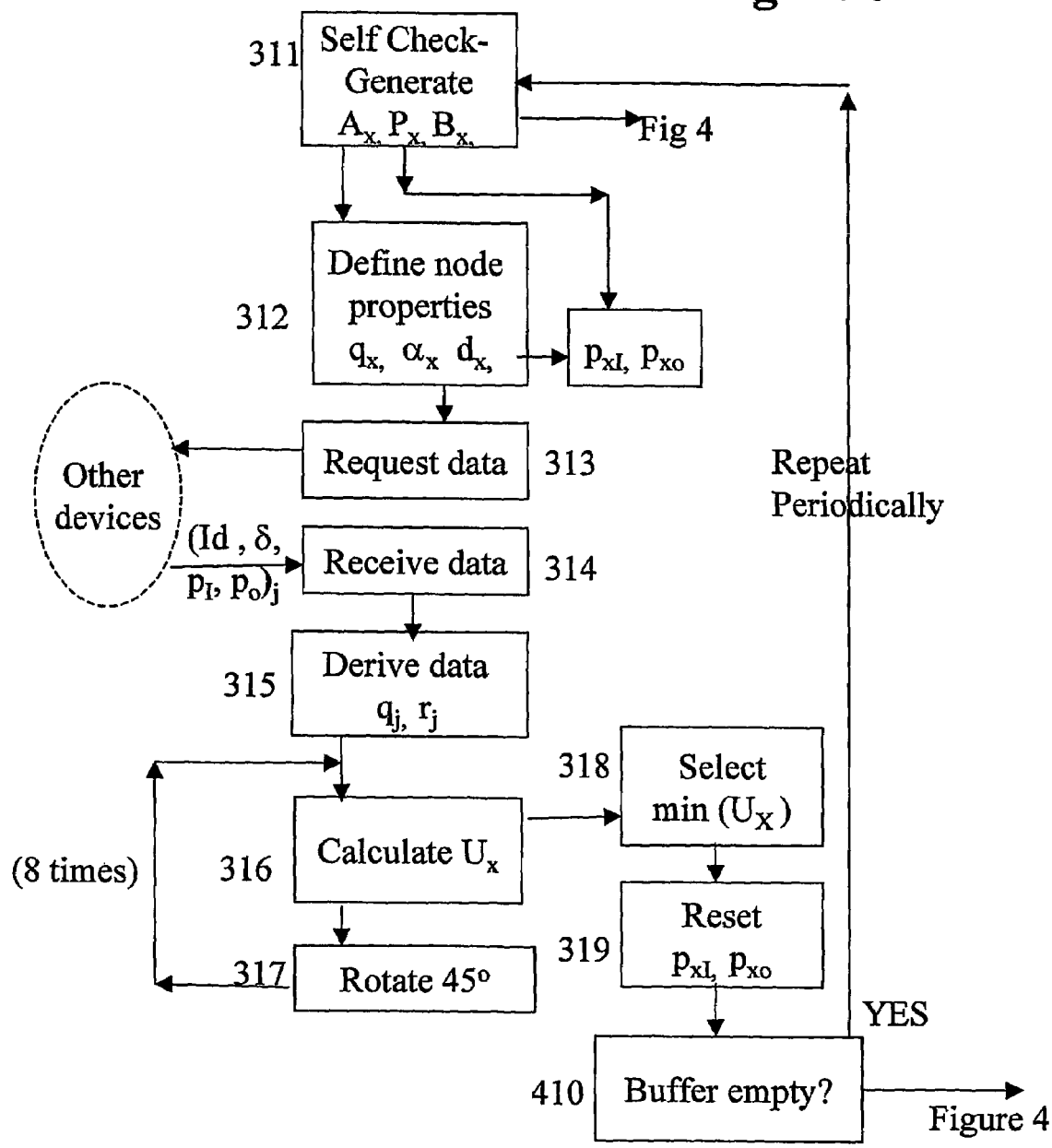
FIG. 3 is a flow chart showing the processes performed by an individual device, and the information it exchanges with similar devices, in order to determine the current values for the parameters used in the invention.
Figure 4:
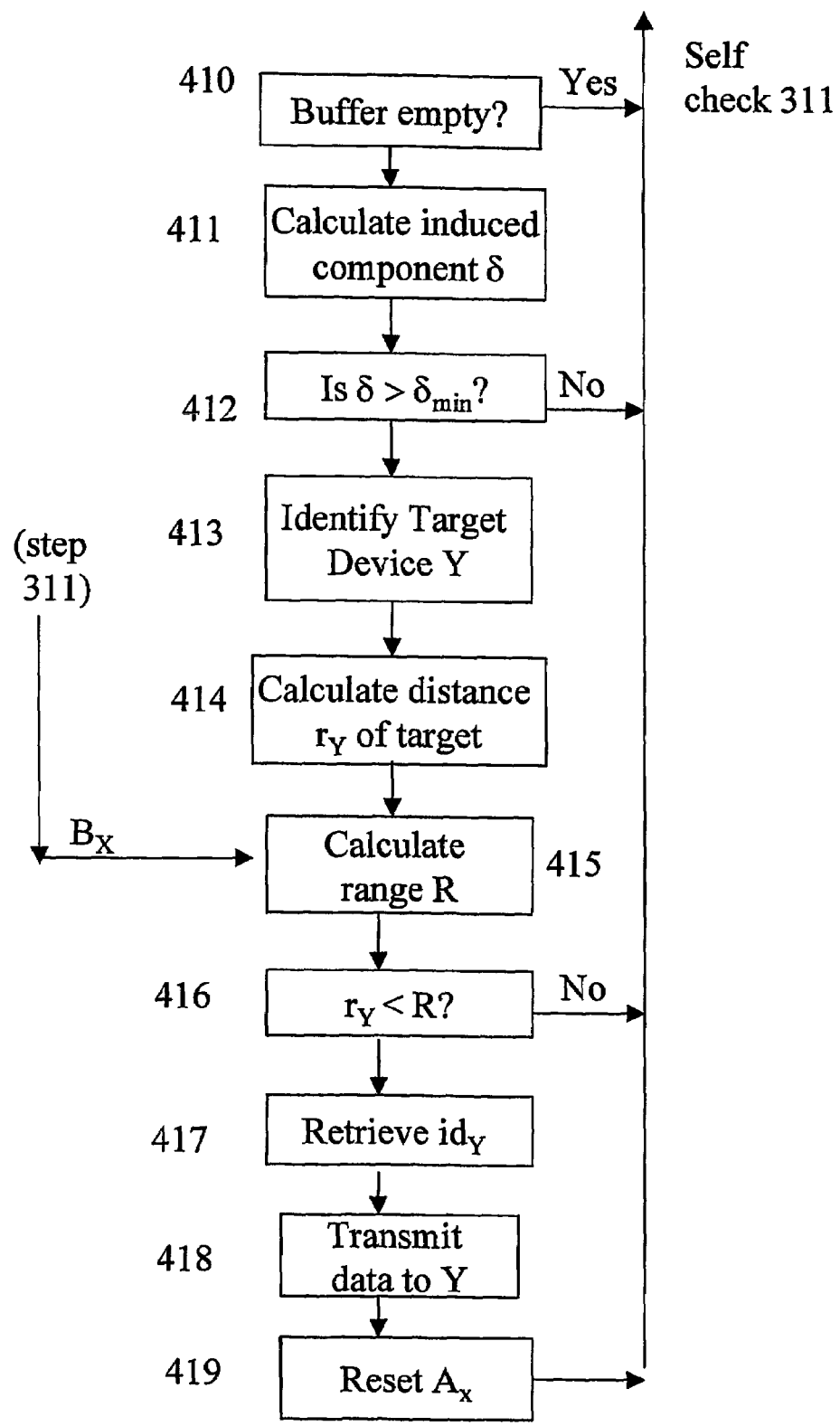
FIG. 4 is a further flow chart, showing the processes used to identify a destination device and to transmit data to it, using the parameters generated in the process of FIG. 3.

The operation of this embodiment will now be described, with reference to FIGS. 3 and 4.

Each mobile device (20 etc) initially measures and stores a number of attributes relating to itself (step 311). These attributes are:

Buffer size $A_X$ a scalar quantity representing the amount of data awaiting transmission, expressed as a fraction of the total capacity of the buffer 24.

Battery charge remaining, $B_X$ another scalar quantity representing the expected life of the device Position, $P_x$ a pair of co-ordinates (or a triplet if three dimensions are needed) The position will be known since environmental sensors need to be able to determine their position for the data they collect to be useful. Each device may have means such as a GPS (Global Positioning System) sensor for this purpose. Alternatively, provided at least one device can determine its absolute position, the absolute positions of all the others can be derived, as discussed in International Patent Specification WO03/107595 which provides a method of estimating the location of a device within a network of devices each of which forms a node of the network, the method including the steps of:

obtaining information specifying the location or estimated location of one or more neighbouring nodes;

measuring the distance to said one or more neighbouring nodes; and iteratively modifying an estimated location of the device, such as to improve the consistency between the estimated location of the device and the location or estimated location of the one or more neighbouring nodes, as determined from the obtained information specifying the location or estimated location of the one or more neighbouring nodes, on the one hand and the measured distances to each of the one or more neighbouring nodes on the other hand.

Using the values $A_x$, $B_x$ and $P_x$ the positions and other attributes are defined (step 312) for two virtual nodes 201, 202, referred to herein as the positive node and the negative node. The nodes are constrained to be located at diametrically opposed points $P_+$, $P_-$ on a circle 23 (or a sphere in a three dimensional embodiment) centred on the device 20. The diameter $d_x$ of the circle is a function of the buffer size $A_X$. Thus the actual position $P_x$ of the device 20 is the mid-point of a line of length d joining the positions $P_+$ $P_-$ of the two nodes. The orientation of this line is initially arbitrary (it may be defined with reference to the device itself or a compass bearing, or a previous position), but it subsequently takes up a position 200 determined by the properties of neighbouring devices 10, 30, 40 etc.

The nodes 201, 202 represent an input direction and an output direction for the device 20. These are the directions respectively in which data is to be forwarded, respectively, to and from the device 20. However, it should be clearly understood that the nodes 201, 202 are purely points in space, defined with respect to the relative positions of the device 20 and its neighbours. Unless directional antennas are to be used, it does not relate to the actual orientation of the device itself, which may be changing rapidly for example if the device is in a turbulent fluid. A network sink is represented as a single positive node, co-located with the device 90 it represents.

Each node is attributed an influence value $Q_+$, $Q_-$. This Influence value is a measure of the ability of that node to influence the nodes of other devices 10, 30, 40 etc. The positive node of each mobile wireless relay device has an activity value $Q_+$ whose value is a positive number. The output end has a negative activity value $Q_-=-Q_+$ equal in magnitude to the influence value of the positive node. The scalar magnitude of the influence values of the node pair has two components: an intrinsic component q which is simply a function of the buffer size $A_X$, and is independent of other devices, and an induced component $\delta$, which is influenced by neighbouring devices. As will be discussed later, the value of the induced component $\delta$ depends on the positions and influence values of the neighbouring devices, and their ability to be influenced by other devices $\alpha_x$, which is again a function of the buffer size $A_X$.

The properties d, q, and $\alpha$ are selected such that the strongest interactions occur between a device with a full buffer (A=1) and another device with an empty buffer (A=0). The influence value $Q_S$ for a sink 90 is set at the maximum value.

In this embodiment $Q_S=1$, and all other devices have fractional values for Q. These properties could be allowed to vary continuously according to the quantity of data in the device's buffer, but to reduce the memory and calculation required this embodiment quantifies buffer size as one of a small number of levels, for example empty, full, and three intermediate levels—each level having a specified value for each property $d_x$, $q_x$, $\alpha_x$. This requires the devices 20 etc to store just (5 levels×3 properties)=15 values, minimising the memory required of the devices. Any device can then determine the values of $d_x$, $q_x$, $\alpha_x$ for itself, or for any neighbouring device, from the buffer size category $A_x$ alone.

In order to calculate the forwarding direction for a device X, only the permanent components $q_+$, $q_-$ of the influence values are used. Initially the induced component $\delta_x$ is set at zero.

When a device X has data stored in its buffer, it broadcasts a signal (step 313) to identify whether any other devices are in the vicinity. Any device 10, 30, 40 detecting this broadcast responds (step 314) with the positions $P_{Y+}, P_{Y-}$ of its own node pair, and the induced influence component $\delta_Y$. This is sufficient information to determine the other properties of the node pair—from the positions of the pair of nodes their separation $d_Y$ can be determined, from which can be deduced the buffer category $A_Y$, and hence the permanent influence values $q_{y+}, q_{y-}$ of the two nodes (step 315).

Using the position and influence attributes received from its neighbours, a device X can then determine a scalar interaction value $$U_X = \sum_i^{i \in X} \sum_j^{j \neq i} \frac{q_i q_j}{r_{ij}},$$

(step 316) for both nodes i of the device performing the calculation and all nodes j of any neighbouring devices 10, 30, 40 etc, and where $r_{ij}$ is the distance between node i and node j. W Note that the value of $q_i$ is the same for each term in this summation, except that it is negative when considering the negative node, so this formula can be simplified to $$U_X = q_{X+} \left( \sum_j^{j \notin X} \frac{q_j}{r_{j+}} - \sum_j^{j \notin X} \frac{q_j}{r_{j-}} \right)$$

where $q_{X+}$ is the influence value of the positive node of device X, and $r_{j+}$ is the distance between the positive node of device X and node j of another device, and $r_{j-}$ is the distance between the negative node of device X and node j of another device. As the nodes are merely virtual points in space, it is possible that nodes of neighbouring devices may de defined to be at the same point.

Thus, for each of the two nodes i of the device X under consideration, the aggregate value of the influence attributes of each node j of its neighbours may be calculated, weighted for distance r. (Since r=0 would lead to an infinite value for $U_X$, the value of "r" is defined such that it cannot be less than a predetermined minimum value). Note that each neighbouring device will have two nodes to be considered, whose activity attributes $q_+$ $q_-$ are equal and opposite, but whose distances r from any other given node j will generally be different, as one node will be nearer than the other. Thus the number of interactions to be determined is 4n where n is the number of neighbour devices—each neighbour has two nodes, and the interaction of each neighbour node is considered with each of the device's own two nodes.

The orientation 200 of the nodes 201, 202 in the device is initially arbitrary: but having established a value for $U_X$ the positions of the nodes are now redefined to be rotated about the centre $P_X$ (the actual location of the device X) (step 317) and a new value of $U_X$ is calculated (repeat step 316). In the present embodiment eight orientations are assessed in this way, spaced at 45 degrees. Note however that the positions of the nodes $P_{X+}, P_{X-}$ are symmetric about the centre $P_X$, and they differ only in the sign of their influence values Q. Consequently only four calculations need to be performed—the other four have the same magnitudes, but opposite signs.

An optimum orientation 200 is then determined (step 318)—this is the orientation giving the minimum value of $U_X$. This orientation 200 is then maintained for subsequent steps of the process, and the positions $P_+$ $P_-$ of the nodes 201, 202 are stored (step 319) for transmission to other devices 10, 30, 40 when they request them, to use in their own computations. If each device maintained constant values for positions P and buffer states A, (and hence influence value Q) their node orientations would eventually reach a steady state. However, in practice, the devices are moving and transferring data, so these values are constantly changing.

Any device 30 that detects a sink 90 in the vicinity would therefore generate an orientation for its node pair whose direction is towards the sink 90. Such a device 30, in turn, has a knock-on effect on other nearby devices 20, 50 that are too far away from the sink 90 to forward to it directly, and these nearby devices 20, 50 will also influence devices 10, 40 yet further away from the sink 90, to orient their forwarding directions so as to make a path to the sink 90, via the intermediate devices 20, 30 (for example path 19, 29, 39). The result is that, irrespective of network topology, all devices (unless entirely cut off by distance from regions of the network that have paths to a sink 90) will have a forwarding direction 200 that is likely to enable transmission of data to a sink 90.

The aggregate alignment influence of neighbouring devices is therefore determined quantitatively, according to the separation of the devices r, and their current preferred forwarding directions. In general, a device is likely to be within the influence of several other devices, some of which will have conflicting (opposite) influences, and their effects need to be combined to provide a single forwarding node pair. Usually, a device will be most strongly influenced by the neighbour closest to itself, but will also be influenced to a lesser extent by the other neighbours. As will be explained below, other factors intrinsic to the devices, in particular the available buffer storage, may not be equal for all devices, and these will affect the scalar magnitude (but not the direction) of the influence value q, reducing or increasing the influence it has on neighbouring devices.

The alignment, and thus the positions of the nodes $P_+$ $P_{31}$ is recalculated whenever the device 20 generates, receives or transmits payload data as this affects the buffer capacity $A_X$. The alignment may also be recalculated periodically as the device 20 and its neighbours move if resources are available.

When a device starts a calculation of its alignment, the initial value it uses for the position of the negative node is as close as possible to that calculated at the previous iteration, subject to the constraint that it must be at a distance d/2 from the position P of the device itself. If the device has not moved, the positive node will therefore also be in the same position as at the previous iteration. However, if the device has moved the initial position of the positive node will have moved. Thus the orientation of the device will rotate such that it still points towards the same point in space (the negative node). An alternative approach would be to keep the orientation the same, i.e. parallel with its previous orientation.

When the device has data to transmit, (i.e. the buffer 24 is not empty) (step 410) the device performs further computations to determine the strength of interaction (alignment influence) between neighbouring nodes, as will now be discussed with reference to FIG. 4. A strong interaction indicates that forwarding is likely to be useful: both in terms of proximity of a device with buffer capacity to accept the payload data, and also with a good probability of a long-range forwarding chain to the sink 90. This is done by calculating an induced component δ of the influence value Q, which is itself influenced by the influence values $q_i$ of neighbouring devices, and is given by $$\delta_X = \frac{\alpha_X}{d_X} \sum_j^{j \neq A} \frac{q_X(q_j + \delta_j)}{r_{Xj}^2}, \quad \text{(step 411)}$$

where $\delta_j$ is the induced component of Q for a node j of a neighbouring device, $\alpha_X$ is the measure referred to above of the degree to which the node X can be influenced, $d_X$ is the spacing between the nodes of device X, and $q_X$ is the permanent influence value of device X, all of which values are derived from the buffer size $A_X$. $q_j$ is the influence value of a neighbouring node at distance $r_{xj}$. If this induced value exceeds a pre-set threshold, then data is forwarded to the nearest device to the negative node of the device, provided that this neighbouring device is within transmission range.

The induced value, $\delta_X$, is compared with a fixed threshold $\delta_{min}$, (step 412). The nearest device 30 to the negative node P. (202) is identified from the position data of the neighbours (step 413). The distance r of this device is determined (step 414 and compared (step 416) with a broadcast range R. A check is made (step 417) to ensure the payload data did not originate from the target neighbour device. Lastly, the invention restricts the choice of influencing neighbouring devices to exclude from consideration any subject device from which data has recently been received. This is to stop data "ping-ponging" backwards and forwards. Larger loops may occur briefly from time to time, but they would be unlikely to persist for long as the relative positions of the sensors change, and in the absence of a sink node in the vicinity.

The broadcast range R is determined (step 415) according to the ratio of (battery power left)/(time left), as follows:

$$R = range_{min} + \frac{B_0 - B}{2(t_{max} - t)}(range_{max} - range_{min}),$$

where B is the current battery level and $B_0$ is the initial battery level, and t and $t_{max}$ are the current time and length of the data-gathering experiment respectively; range is not allowed to exceed $range_{max}$.

If the neighbour device 30 is within broadcast range (r<R) and the other conditions referred to above are met the payload data is retrieved from the buffer store 24 and addressed to the neighbour device 30 using its id code (step 418).

More sophisticated controls could be used, based on the quantity of data left in the device buffer, perhaps, but this simple approach has been shown to give advantage compared with a range that is independent of battery power, and it is easy for simple devices to calculate.

If a device 20 is cut off from any path to a sink 90 it can simply store any payload data in the buffer 24 until the movements of the devices re-establishes a feasible route. Forwarding directions 200 are updated dynamically, so that as soon as a link 29 is re-established, transmission of data can re-start. If the network is sparsely populated, such that nodes are widely separated, most data transmissions may only occur when a device 20 comes within direct range of a sink 90. In densely populated networks paths having a larger number of hops 19, 29, 39 will be more common. The process is flexible enough to cope with a wide range of circumstances, in terms of network topology and device mobility, without such variations requiring special treatment.

Computer simulations of systems of devices according to this invention have been found to route data so that less transmission energy is used for forwarding, more data is recovered, and fewer hops are needed than with a simpler approach that always chooses to forward in the direction of the nearest network sink. The invention has the ability to convey longer-range network structural information than would otherwise be available to the mobile devices, through the interactions of their preferred forwarding directions.

What is claimed is:

1. A mobile data wireless relay device, the device comprising:

receiving means for receiving payload data from a data source;

a buffer for storing payload data for subsequent transmission;

means for receiving status data from similar devices;

status data generation means for generating status data, the status data being derived from the quantity of data in the buffer store and the status data received from other devices comprising data relating to:

the position of the device, the quantity of data in the buffer store a scalar forwarding value and a forwarding direction;

status transmitter memos for transmitting status data to other devices;

selection means for identifying from the status data a receiving device to which the payload data is to be forwarded, the receiving device being located in a position indicated by the forwarding direction; and payload transmission means for transmitting the payload data to the receiving device;

means for defining a first node and a second node, the nodes being spaced apart by a distance determined by the amount of data stored in the buffer, the first node being assigned a positive value for an attribute q and the second node being assigned a negative value for the attribute q, equal in magnitude to that assigned to the positive node;

the wireless relay device including means for receiving data broadcast by similar wireless relay devices identifying the position data and attribute values of nodes defined by the similar wireless relay devices;

means for generating position values for the first and second nodes based on the attribute values of its own nodes and the positions and attribute values of the nodes defined by the neighboring devices;

means for transmitting the position data and attribute values to similar wireless relay devices; and means for transmitting payload data to devices that are in the general direction of the second node.

2. A mobile data wireless relay device according to claim 1, comprising means for receiving payload data transmitted by other similar devices.

3. A mobile data wireless relay device according to claim 1, further comprising a data source.

4. A mobile data wireless relay device according to claim 1, wherein the selection means is arranged to only identify a suitable receiving device if the scalar forwarding value meets a threshold criterion.

5. A mobile data wireless relay device according to claim 1, further comprising condition-monitoring means for monitoring the expected lifetime of the device, and adjusting the scalar forwarding value accordingly.

6. A mobile data wireless relay device according to claim 1, wherein:
the positions of the first and second nodes are determined by determining the position in which the aggregate value of the products of the attribute values of each node with each node of one or more neighboring devices, and an arithmetical function of the distance between them, is a minimum or maximum.

7. A network of wireless relay devices comprising:
a plurality of mobile wireless relay devices capable of receiving payload data,
each said device comprising means for identifying a forwarding direction relative to itself, and means for transmitting data to another of the devices whose current position is in the said forwarding direction and within a predetermined distance,
wherein the devices co-operate to define their forwarding directions such that payload data is transmitted to a target sink device by means of one or more of the wireless relay devices,
each device defines a positive receive node and a negative transmit node, spaced a pre-determined distance apart, and
the devices co-operate to define the positions of the nodes so as to the minimize aggregate distances between nodes having opposite signs, and
the forwarding direction of each device is defined as the direction from its receive node in which its transmit node lies.

8. A method of operating a plurality of mobile data wireless relay devices, said method comprising:
collecting data in buffer stores in one or more such devices;
exchanging status data between the devices, the status data comprising data relating to:
the positions of the devices, and
the quantity of data in their buffer stores;
each device defining, from the status data, a forwarding direction towards which the pay-load data in its buffer store is to be forwarded; and
transmitting the stored payload data to a device located in the forwarding direction,
wherein each device defines a first node and a second node, the nodes being spaced apart by a distance determined by the amount of data stored in the buffer, the first node being assigned a positive value for an attribute q and the second node being assigned a negative value for the attribute q, equal in magnitude to that assigned to the positive node;
position values are generated for the first and second nodes based on the status data of the device and neighboring devices;
transmitting the position data and attribute values to similar wireless relay devices; and
transmitting payload data to devices that are in the general direction of the second node.

9. A method according to claim 8, wherein: data is only transmitted from a first device to a second device located in its forwarding direction if a scalar forwarding value derived from the status data exceeds a predetermined value.

10. A method according to claim 8, wherein the status data includes a measure of the expected lifetime of the device.

11. A method according to claim 8, wherein: the positions of the first and second nodes are determined by determining the position in which an aggregate value of the products of the attribute values of each node with each node of one or more neighboring devices, and an arithmetical function of the distance between them, is a minimum or maximum.

12. A method according to claim 11, wherein: the devices co-operate to define the positions of the nodes so as to minimize aggregate distances between nodes having opposite signs, and the forwarding direction of each device is defined as the direction from its receive node in which its transmit node lies.

13. A method according to claim 8, wherein: the devices co-operate to define their forwarding directions such that payload data is transmitted, by means of one or more of the wireless relay devices, to a target sink device defined by a receive node.

* * * * *